United States Patent [19]

Esmond

[11] 4,199,457
[45] Apr. 22, 1980

[54] PLEATED ARTIFICIAL KIDNEY

[76] Inventor: William G. Esmond, 800 Country Club Rd., Havre de Grace, Md. 21078

[21] Appl. No.: 628,901

[22] Filed: Nov. 5, 1975

[51] Int. Cl.² .............................................. B01D 31/00
[52] U.S. Cl. ............................. 210/321 B; 210/493 M
[58] Field of Search ................. 210/22, 321 B, 493 M

[56] References Cited

U.S. PATENT DOCUMENTS

| | | | |
|---|---|---|---|
| 3,560,340 | 2/1971 | Leonard | 210/22 X |
| 3,780,870 | 12/1973 | Esmond | 210/321 B |
| 3,910,841 | 10/1975 | Esmond | 210/321 |

Primary Examiner—Charles N. Hart
Assistant Examiner—David R. Sadowski
Attorney, Agent, or Firm—Charles E. Brown

[57] ABSTRACT

This disclosure relates to a transfer device, preferably in the form of an artificial kidney, which is formed of a continuous membrane film reversely folded or pleated so as to define sets of films with each set including two film layers and there being disposed between adjacent sets of film layers first spacers extending in the central area of the device and for a major portion of the length thereof, and second spacers between the films of adjacent sets of films at the ends thereof, the second spacers being spaced from the first spacers, and there being third spacers aligned with the second spacers, but each third spacer being between the two films of a set with the second and third spacers combining to define flow passages into and out of between the two films of the sets of films for a first fluid, and there being means for introducing a second fluid, at a lesser pressure than the first fluid, into the first spacers at the ends thereof with the films of each pair of films ballooning into the first spacer to define plural longitudinal passages which are generally distorted so as to provide for a maximum transfer between the first and second fluids on the opposite sides of each film.

7 Claims, 10 Drawing Figures

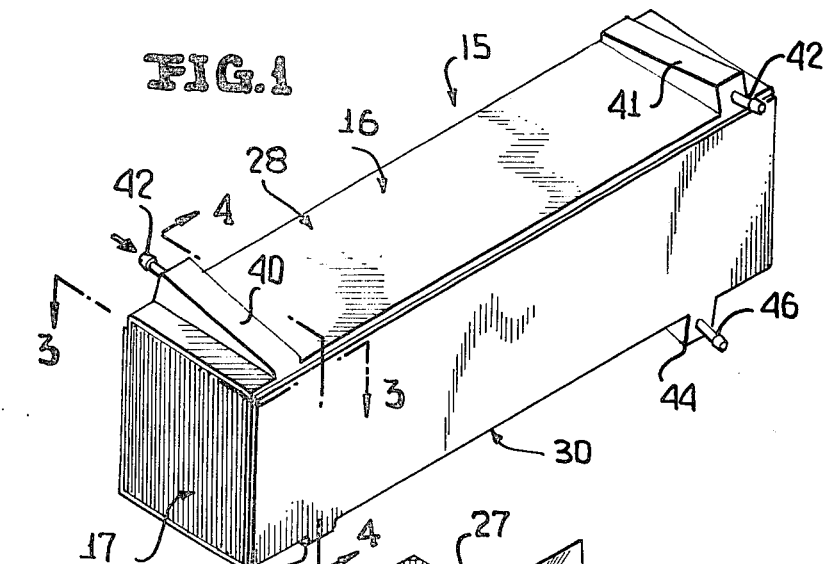
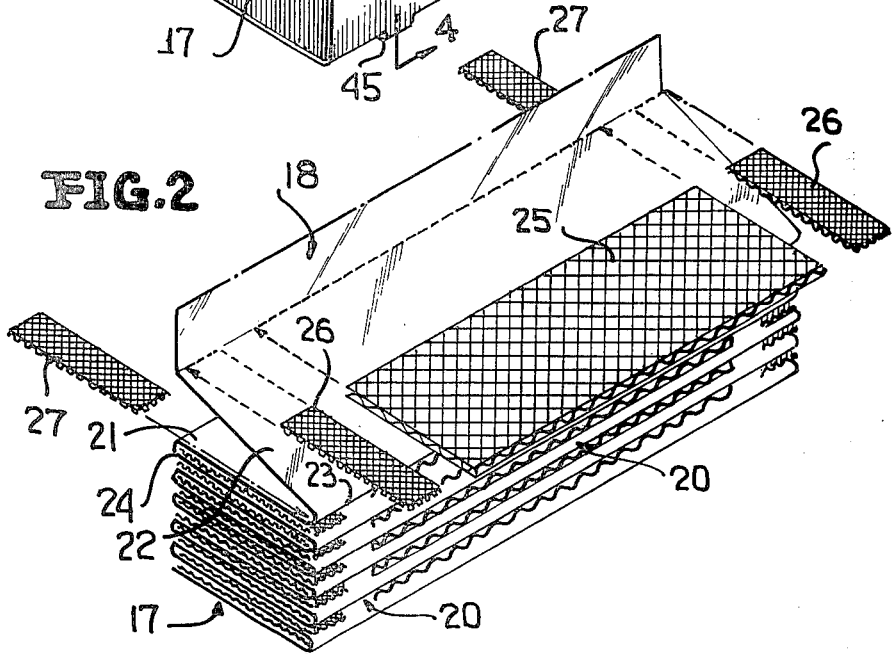
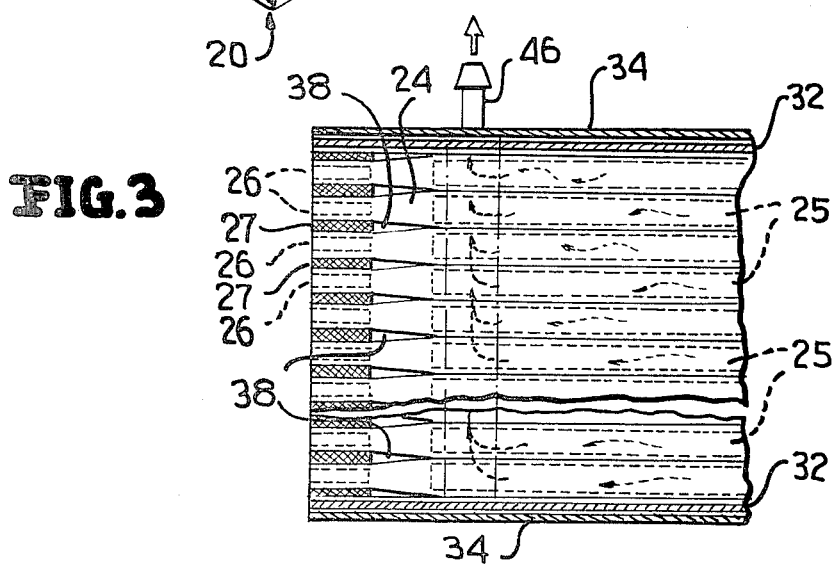

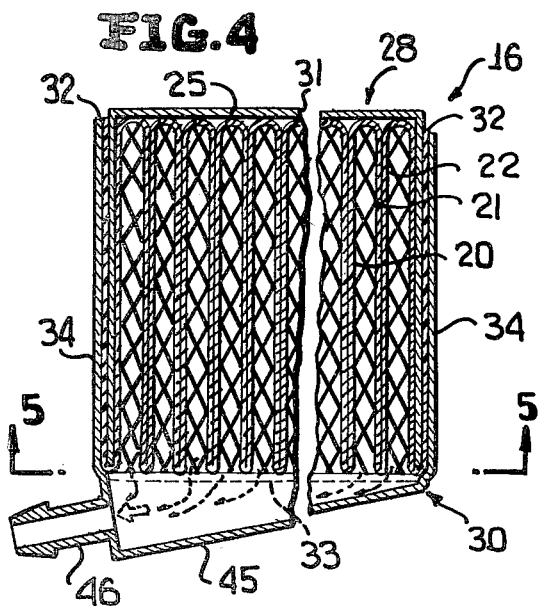
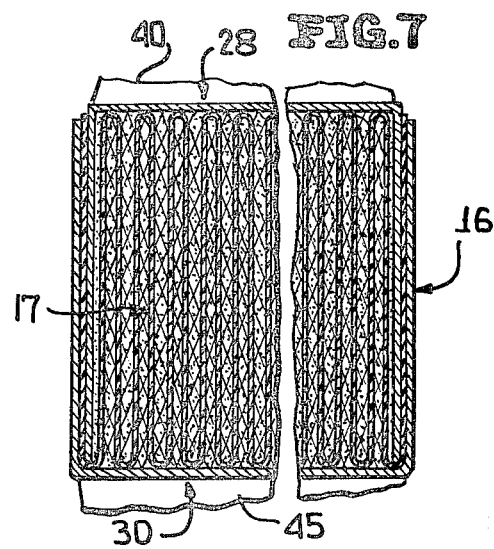
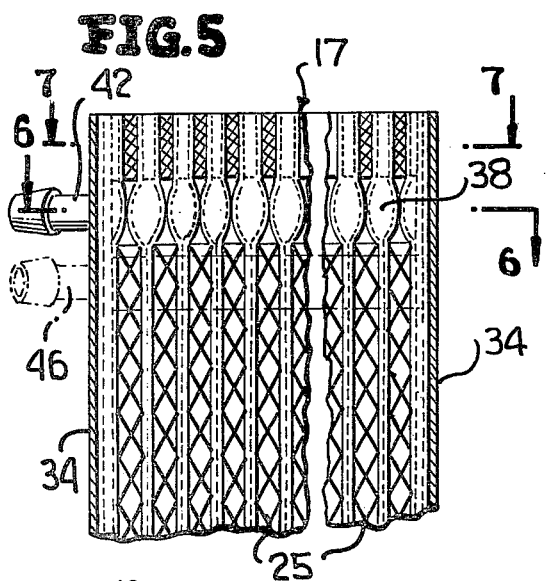
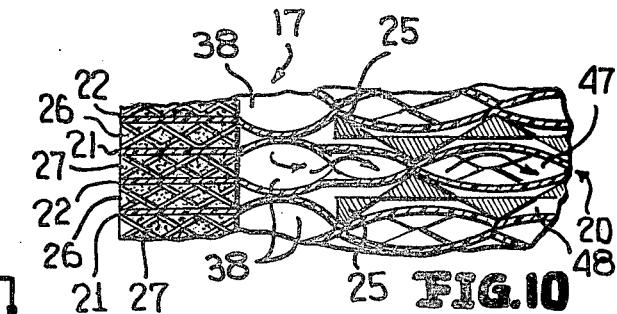
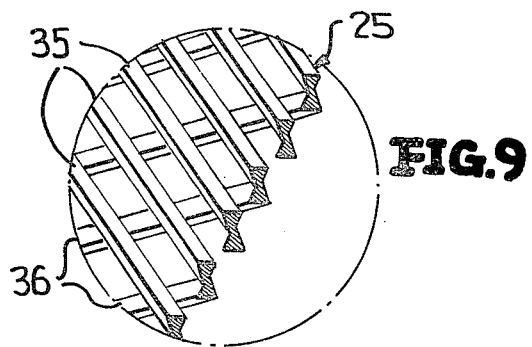
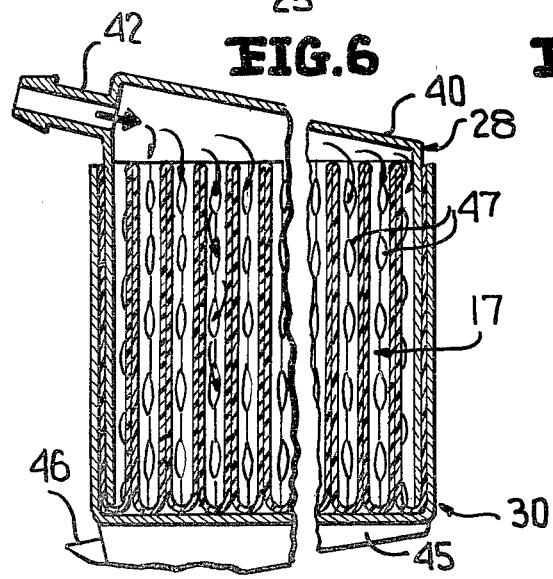
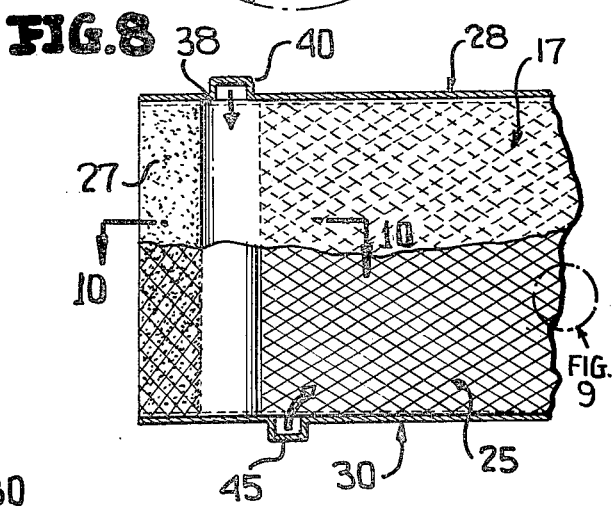

PLEATED ARTIFICIAL KIDNEY

DESCRIPTION OF THE INVENTION

This invention relates in general to new and useful improvements in transfer devices, and more particularly to a novel transfer device in the form of an artificial kidney.

In recent years there have been developed numerous artificial kidneys which have proven to be effective for the intended purpose. However, the costs of such artificial kidneys have been relatively great notwithstanding many efforts to reduce the same. This invention particularly relates to a novel artificial kidney which may be produced at a minimum expenditure for a maximum transfer effect.

In accordance with this invention, there is provided a simple membrane film which may be readily pleated so as to define a plurality of films and wherein the plurality of films may be considered to be divided into sets of two films each. Between the films of each set it is desired to flow blood and between the films of adjacent sets, it is desired to flow a suitable dialysate. It is further desired to have control over the flow of the two fluids, i.e., blood and dialysate, coupled with a maximum transfer area within the kidney.

In accordance with this invention, between adjacent sets of films, first spacers are provided. These spacers are arranged centrally of the length of the kidney and extend a major portion of the length thereof. The first spacers are perforated and are of a multi-planar construction so as to both facilitate fluid flow therethrough and the ballooning of the adjacent films into the interstices thereof.

In order that the blood may be introduced in between the normally adjacent films of each set, there are also provided second spacers, which spacers are disposed between each set of films at the end of the kidney and spaced from the first spacers. Finally, there are third spacers aligned with the second spacers, but disposed between the films of each set of films. The combined thicknesses of these second and third spacers correspond to the thickness of the first spacers. The arrangement of the spacers is such that openings between the film of each set are initially provided and these openings are enlarged by the pressure of the blood introduced between the films. Therefore, the higher pressure of the blood as compared to the dialysate will effect the necessary ballooning of the films of each set of films apart so as to permit the formation of the desired blood channels.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a perspective view of the kidney formed in accordance with this invention.

FIG. 2 is a perspective view, with part exploded, of the transfer pack of the kidney of FIG. 1 with the transfer pack being rotated 90° in a counterclockwise direction.

FIG. 3 is an enlarged fragmentary, horizontal sectional view taken along the line 3—3 of FIG. 1 and shows generally the construction of the kidney.

FIG. 4 is an enlarged transfer sectional view taken along the line 4—4 of FIG. 1 and shows more specifically the construction of the kidney and the flow of the dialysate.

FIG. 5 is a longitudinal horizontal sectional view taken along the line 5—5 of FIG. 4 and shows generally the arrangement of the blood flow passages of the kidney.

FIG. 6 is a transverse sectional view taken along the line 6—6 of FIG. 5 and shows further the blood flow of the kidney.

FIG. 7 is an enlarged transverse vertical sectional view taken along the line 7—7 of FIG. 5 and shows specifically the construction of the kidney at one end thereof.

FIG. 8 is a vertical, longitudinal sectional view taken through an end portion of the kidney and shows further the constructional details thereof.

FIG. 9 is an enlarged fragmentary perspective view showing the specific construction of at least the first spacers.

FIG. 10 is an enlarged fragmentary horizontal sectional view taken along the line 10—10 of FIG. 8 and shows more specifically the flow of blood within the kidney.

Referring now to the drawings in detail, it will be seen that the transfer device, i.e., the artificial kidney, of this disclosure is generally identified by the numeral 15. The kidney 15 includes basically a housing 16 in which there is sealed a transfer pack, generally identified by the numeral 17. As is best shown in FIG. 2, the transfer pack 17 includes a continuous membrane film 18 which is a plastic film preferably poly-carbonate or polyacrylonitrile. The film 18 is pleated or folded to define a plurality of sets 20 of films which are interconnected. Each set 20 of films includes a pair of films 21,22 connected along a fold line 23. The film 21 of one set 20 of films is connected to the film 22 of the next adjacent set 20 of films along a fold 24.

In the formation of the transfer pack 17, a plurality of spacers are inserted between the films 21,22 in a prescribed pattern. Inserted between adjacent films of adjacent sets 20 of films is a plurality of first spacers 25 which occupy the central portion of the transfer pack 17 and terminate in space relation from the ends thereof. Also positioned between the films of adjacent sets 20 of films are second spacers 26. The spacers 26 are positioned at the ends of the transfer pack 17 and are longitudinally spaced from the spacers 25. Finally, third spacers 27 are positioned in the transfer pack 17 in alignment with the second spacers 26, but are positioned between the films 21,22 of each set 20 of films.

After the transfer pack 17 has been completed, it is assembled in sealed relation within the housing 16. As is clearly shown in FIG. 4, for example, the housing 16 includes a first half 28 and a second half 30 arranged in telescoped relation. The first half 28 includes a top wall 31 and depending side walls 32 while the bottom half 30 includes a bottom wall 33 and upstanding walls 34.

The transfer pack 17 is first assembled within the upper half 28 of the housing 16 within most portions of the film 18 extending exteriorly of the side walls 32. Then the lower half 30 of the housing 16 is assembled with the upper half 28 and a seal is formed between the outer surfaces of the transfer pack 17 and the housing 16 while the edges of the transfer pack 17 oppose the top wall 31 and the bottom wall 33.

It is to be understood that the ends of the transfer pack 17 are also sealed both with respect to the transfer pack per se and with respect to the housing 16. This may be simply accomplished by means of a potting compound which will fill the end portions of the spacers 26,27 and also form a seal between the spacers 26,27 and the film 18 as well as a seal between the transfer pack 17 and the end portions of the housing 16.

Reference is now made to FIG. 9 wherein the detailed construction of one of the spacers 25 is illustrated. It is to be noted that the spacer 25 is of an extruded construction and includes a first set of strands 35 which generally lie in a first plane and which extend in spaced parallel relation. The spacer 25 includes a second set of strands 36 which lie in a second plane and which are also in a generally spaced parallel relation. The strands 35 extend in a first direction while the strands 36 extend in a second and different direction with the strands 35 and 36 being in crossing relation. Where the strands 35 and 36 cross one another, they are integrally bonded to one another. Although these strands 35 and 36 have been illustraded as having a triangular cross-section, it is to be understood that other cross-sections are possible although the triangular cross-section provides for a maximum contact surface between the strands 35,36 at their points of crossing and thus a maximum bond, and a maximum exposed area of transfer film.

Referring now to FIG. 3, it will be seen that with the spacers 26 lying generally centered of the plane containing the spacers 25, and the spacers 27 lying in a plane extending between adjacent spacers 25, the films 21,22 of each set 20 of films are spaced apart at the ends of the respective spacers 27 and then converged together between the spacers 25 leaving intermediate the spacers 26,27 and the spacers 25 a plurality of flow passages 38 which are initially triangular, as is clearly shown in FIG. 3. The flow passages 38 open into and out of the space between each set 20 of films so that fluid flow between the films 21,22 of each set 20 of films may occur in the area of the films aligned with the spacers 25.

Referring now to FIG. 1, it will be seen that the housing half 16 is provided with a pair of manifolds 40,41 which extend transversely of the transfer pack 17. Each of the manifolds 40,41 is provided with a suitable fitting 42 to which tubing or other fluid conductors may be readily connected. For purposes of illustration, the manifold 40 is to be considered the supply manifold and the manifold 41 is to be considered the discharge manifold.

When the transfer device is an artificial kidney, blood is directed into the artificial kidney through the supply manifold 40. The blood is delivered at a sufficient pressure to effect ballooning of the passages 38 in the manner best shown in FIGS. 5 and 10. The ballooned flow passages 38 thus provide for an ample supply of blood between the films 21,22 of each set 20 of films. The blood, under pressure, effects a ballooning of the films 21,22 between the spacers 25 into the interstices of the spacers 25 as is shown in FIG. 10, to define distorted but continuous flow passages between the films 21,22 of each set 20 entirely across the space between adjacent spacers 25. It is to be understood that this ballooning of the films 21,22 is exaggerated in FIG. 10, but that the arrangement provides for the maximum surface area of contact between the blood and the films 21,22 with a minimum volume of blood.

The blood, after forming its own passages between the films 21,22 in the manner shown in FIG. 10, then passes through similar passages 38 at the opposite end of the transfer pack 17 and out through the manifold 41. At this time it is pointed out that if the blood were introduced into the manifold 41, it would flow equally as well in the opposite direction through the transfer pack 17 and out of the manifold 40.

Manifold means are also provided for the dialysate and these manifold means include a supply manifold 44 and a return manifold 45 formed on the bottom wall 33 of the housing half 30. Each of the manifolds 44,45 is provided with a fitting 46 to which tubing or other fluid flow means may be connected.

As is clearly shown in FIGS. 3, 4, and 8, the manifolds 44,45 open into the lower edge of the transfer pack 17 into direct communication within the portions of the spacers 25. Thus flow of the dialysate through the spacers 25 between the adjacent films 21,22 of adjacent sets 20 of films occurs. In other words, with reference to FIG. 10, the blood, which is at a higher pressure than the dialysate, causes a ballooning of the films 21,22 of each set 20 between adjacent spacers 25 to define blood flow passages 47. However, the ballooning of the films 21,22 into the interstices of the spacers 25 is only partial so as to leave the openings in the spacers 25 open for an easy flow of dialysate through and around each spacer 25 in the form of dialysate flow path 48.

It is to be understood that the sole purpose of the spacers 25 is to permit the ballooning of the films 21,22 under the fluid pressure of the blood introduced therebetween while controlling such ballooning so that a second fluid, the dialysate, may flow on the opposite surfaces of the films for the proper transfer through the films. It is to be understood that the construction of the films 21,22 will vary depending upon the intended purpose of the transfer device. As indicated above, when the transfer device is an artificial kidney, the films will be in the form of membranes of a suitable plastic material, such as poly-carbonate or poly-acrylonitrile.

It is to be understood that the film and the spacer materials utilized in the transfer pack 17 are readily available at a relatively low cost and due to the relative ease of assembling of the spacers with the pleated film, the transfer pack 17 may be quickly formed at a relatively low cost. This, together with the advantage of a minimum blood supply for a maximum transfer, provides for a very economical and highly useful artificial kidney.

Although only a preferred embodiment of the transfer device has been specifically illustrated and described herein, it is to be understood that minor variations may be made in the transfer device without departing from the spirit and scope of the invention, as defined by the appended claims.

I claim:

1. A transfer device comprising plural sets of pairs of films having remote ends, a first spacer (25) extending between adjacent films of adjacent sets of film for a major portion of the lengths of said films, said films being the form of a continuous film arranged in pleated relation, a pair of second spacers (26) between adjacent films of adjacent sets of films at the opposite ends thereof, second spacers of each pair of second spacers being spaced longitudinally from a respective first spacer to facilitate deformation of said films and define inlet and discharge passages in communication with spaces between adjacent films of adjacent sets of films, third spacers (27) between films of each set of films further defining said inlet and discharge pasages, said second spacers and third spacers being generally of a like configuration and aligned with one another and the combined thickness of a second spacer and a third spacer being substantially equal to the thickness of an adjacent first spacer, said first spacers being perforated and multi-planar for the longitudinal flow of a fluid therethrough, said second and third spacers being closed to longitudinal fluid flow therethrough, and first manifold means for directing a first fluid at a pressure into said inlet passages and between films of each film set and out said discharge passages, and second manifold means for directing a second fluid at a lesser pressure than said first pressure into one end of each first spacer and through each first spacer and out of the other end thereof.

2. A transfer device according to claim 1 wherein in use said inlet and discharge passages are enlarged by the first fluid under pressure therein.

3. A transfer device according to claim 1 wherein in use said inlet and discharge passages are enlarged by the first fluid under pressure therein, and said films of each set of films are expanded into adjacent ones of said first spacers to form distorted flow passages between said films of each of said sets of films.

4. A transfer device according to claim 1 wherein at least said first spacer comprises first and second strands, said first strands lying generally in a first plane and being arranged generally in spaced parallel relation, and said second strands lying generally in a second plane and arranged generally in spaced parallel relation, said first strands being arranged in crossing relation relative to said second strands, and said strands being united at points of crossing.

5. A transfer device according to claim 1 wherein said device is in the form of an artificial kidney and said films are in the form of a membrane.

6. A transfer device according to claim 1 wherein said sets of film and said spacers are arranged in stacked relation and sealed with a housing, and said first and second manifold means being carried by said housing and opposing edges of said stack.

7. A transfer device according to claim 6 wherein said second and third spacers are sealed to said films, and outermost ones of said films are sealed to said housing wherein fluid flow is limited on edge entrance and departure relative to the stack formed by said films and spacers.

* * * * *